United States Patent
Wang et al.

(10) Patent No.: US 11,672,062 B2
(45) Date of Patent: Jun. 6, 2023

(54) ILLUMINATING DEVICE AND METHOD FOR DRIVING ILLUMINATING DEVICE

(71) Applicant: SAVANT TECHNOLOGIES LLC, East Cleveland, OH (US)

(72) Inventors: Fanbin Wang, Shanghai (CN); Chengbin Liu, Shanghai (CN); Weihu Chen, Shanghai (CN); Ruojian Zhu, Shanghai (CN); Chunyu Guo, Shanghai (CN)

(73) Assignee: SAVANT TECHNOLOGIES LLC, East Cleveland, OH (US)

( * ) Notice: Subject to any disclaimer, the term of this patent is extended or adjusted under 35 U.S.C. 154(b) by 0 days.

(21) Appl. No.: 17/395,402

(22) Filed: Aug. 5, 2021

(65) Prior Publication Data

US 2022/0086981 A1    Mar. 17, 2022

(30) Foreign Application Priority Data

Aug. 17, 2020 (CN) .......................... 202010826372.5

(51) Int. Cl.
*H05B 45/3578*    (2020.01)
*H05B 45/40*    (2020.01)
*H05B 45/34*    (2020.01)
*H05B 45/30*    (2020.01)

(52) U.S. Cl.
CPC ......... *H05B 45/3578* (2020.01); *H05B 45/30* (2020.01); *H05B 45/34* (2020.01); *H05B 45/40* (2020.01)

(58) Field of Classification Search
CPC ...... H05B 45/305; H05B 45/34; H05B 45/40; H05B 45/3578; H05B 45/30; H05B 45/50; H05B 45/10; H05B 45/345; Y02B 20/30
See application file for complete search history.

(56) References Cited

U.S. PATENT DOCUMENTS

2017/0311396 A1* 10/2017 Sadwick .............. H05B 45/395
2019/0338934 A1* 11/2019 Ray .......................... F21K 9/27

* cited by examiner

Primary Examiner — Renan Luque
(74) Attorney, Agent, or Firm — Wood IP LLC

(57) ABSTRACT

The present application discloses an illuminating device and a method for driving the illuminating device. The illuminating device comprises: an LED illuminating module; a mains supply operation module, comprising an LED driving unit; and a ballast operation module, comprising a simulation filament unit, a first detection unit, a second detection unit, a switch unit, a first start unit and a second start unit; wherein when the illuminating device is in a mains supply operation mode, the LED driving unit is used for driving the LED illuminating module; when the illuminating device is in a magnetic ballast operation mode, the first detection unit detects a voltage signal or frequency signal of the simulation filament unit and outputs a first detection signal, and after receiving the first detection signal, the first start unit enables the switch unit to be in a conducting state and drives the LED illuminating module; and when the illuminating device is in an electronic ballast operation mode, the second detection unit detects a voltage signal or frequency signal across both ends of the illuminating device and outputs a second detection signal, and after receiving the second detection signal, the second start unit enables the switch unit to be in a conducting state and drives the LED illuminating module.

25 Claims, 3 Drawing Sheets

ILLUMINATING DEVICE AND METHOD FOR DRIVING ILLUMINATING DEVICE

TECHNICAL FIELD

The present invention relates to an illuminating device and a method for driving the illuminating device, and in particular, to an illuminating device compatible with electronic ballasts, magnetic ballasts and mains supplies, and a method for driving the illuminating device.

BACKGROUND

The traditional fluorescent tube has been applied for decades, and ballasts of various theories and specifications have been developed by various countries and manufacturers, and thus during the replacement of the traditional fluorescent tube with an LED tube, the problem of compatibility of the LED tube with electronic ballasts, magnetic ballasts and mains supplies needs to be solved.

If a circuit is compatible with both a mains input (Type B) and a ballast input (Type A), that is, supports electronic ballasts, magnetic ballasts and mains input, a newly mounted tube or a direct replacement of an original fluorescent tube will not influence the illumination work of an LED, which is an advantage of the compatible input. LED tubes sold on the market can only be compatible with mains supplies or electronic ballasts, but cannot be compatible with three modes of electronic ballasts, magnetic ballasts and mains supplies at the same time, thus causing expensive construction costs for cable change. To this end, there is a demand for an illuminating device which is compatible with electronic ballasts, magnetic ballasts and mains supplies at the same time.

SUMMARY

A main object of the present invention is to provide an illuminating device and a method for driving the illuminating device, so as to solve the problem in the prior art that an LED tube cannot be compatible with three modes of electronic ballasts, magnetic ballasts and mains supplies at the same time.

In order to achieve the described object, according to one aspect of the present invention, there is provided an illuminating device, comprising: an LED illuminating module; a mains supply operation module, comprising an LED driving unit; and a ballast operation module, comprising a simulation filament unit, a first detection unit, a second detection unit, a switch unit, a first start unit and a second start unit; wherein when the illuminating device is in a mains supply operation mode, the LED driving unit is used for driving the illuminating module; when the illuminating device is in a magnetic ballast operation mode, the first detection unit detects a voltage signal or frequency signal of the simulation filament unit and outputs a first detection signal, and after receiving the first detection signal, the first start unit enables the switch unit to be in a conducting state and drives the LED illuminating module; and when the illuminating device is in an electronic ballast operation mode, the second detection unit detects a voltage signal or frequency signal across both ends of the illuminating device and outputs a second detection signal, and after receiving the second detection signal, the second start unit enables the switch unit to be in a conducting state and drives the LED illuminating module.

Preferably, the simulation filament unit comprises a first simulation filament circuit and a second simulation filament circuit, and the first detection unit comprises a first detection circuit and a second detection circuit; the first detection circuit detects a voltage signal or frequency signal of the first simulation filament circuit and outputs a first detection signal for first end, and the second detection circuit detects a voltage signal or frequency signal of the second simulation filament circuit and outputs a first detection signal for second end, wherein the first detection signal for first end and the first detection signal for second end are used as the first detection signal.

Preferably, the illuminating device further comprises a first pair of connecting pins and a second pair of connecting pins, wherein the first pair of connecting pins and the second pair of connecting pins are respectively provided at opposite ends in a longitudinal direction of the illuminating device, and at least one connecting pin among the first pair of connecting pins and the second pair of connecting pins is coupled to an external power source.

Preferably, when at least any two connecting pins among the first pair of connecting pins and the second pair of connecting pins are coupled to the mains supply, the LED illuminating module is driven by the LED driving unit to operate in the mains supply operation mode.

Preferably, when the first pair of connecting pins and the second pair of connecting pins are coupled to a magnetic ballast, the first detection circuit detects a voltage signal or frequency signal of the first simulation filament circuit and outputs a first detection signal for first end to the first start unit, the second detection circuit detects a voltage signal or frequency signal of the second simulation filament circuit and outputs a first detection signal for second end to the first start unit, and after receiving the first detection signal for first end and the first detection signal for second end, the first start unit enables the switch unit to be in a conducting state and drives the LED illuminating module to operate in the magnetic ballast operation mode.

Preferably, the electronic ballast operation mode includes an instant start ballast operation mode, a rapid start ballast operation mode, a program start ballast operation mode.

Preferably, when at least any two connecting pins among the first pair of connecting pins and the second pair of connecting pins are coupled to an instant start ballast, the second detection unit detects a voltage signal or frequency signal across both ends of the illuminating device and outputs the second detection signal, and after receiving the second detection signal, the second start unit enables the switch unit to be in a conducting state and drives the LED illuminating module to operate in the instant start ballast operation mode.

Preferably, when the first pair of connecting pins and the second pair of connecting pins are coupled to a rapid start ballast or a program start ballast, the first detection circuit detects a voltage signal or frequency signal of the first simulation filament unit and outputs a first detection signal for first end, the second detection circuit detects a voltage signal or frequency signal of the second simulation filament unit and outputs a first detection signal for second end, the second detection unit detects a voltage signal or frequency signal across both ends of the illuminating device and outputs the second detection signal, and after the first start unit receives the first detection signal for first end and the first detection signal for second end, and the second start unit receives the second detection signal, the first start unit and the second start unit enable the switch unit to be in a conducting state and drive the LED illuminating module to operate in the rapid start ballast operation mode or the program start ballast operation mode.

Preferably, the illuminating device further comprises: a rectifier unit for rectifying an alternating current inputted to the illuminating device and outputting rectified direct current to the LED illuminating module.

Preferably, the mains supply operation module further comprises: a protection circuit for automatically cutting off an electrical connection between the illuminating device and the external power source when a leakage current in the illuminating device exceeds a predetermined threshold.

Preferably, each of the first simulation filament circuit and the second simulation filament circuit comprises at least one resistor unit and at least one capacitor unit which are connected in parallel and/or in series with each other.

Preferably, each of the first detection circuit and the second detection circuit comprises a current limiting unit, a rectifier unit, a filtering unit and an isolation sampling unit.

Preferably, the current limiting unit comprises a current limiting capacitor or a current limiting resistor.

Preferably, the isolation sampling unit comprises an optocoupler module.

Preferably, the second detection unit comprises a frequency detection unit and a half bridge rectifier unit.

Preferably, the rectifier unit comprises a first rectifier circuit and a second rectifier circuit, each of the first rectifier circuit and the second rectifier circuit comprising a rectifier bridge comprising 2, 4, 8 or 16 diodes.

Preferably, the LED driving unit is a constant current control unit or a constant voltage control unit, and the LED driving unit comprises a transient voltage suppression module and a Buck driver module.

Preferably, the switch unit comprises a switch.

Preferably, the first start unit comprises a driving resistor for driving the switch unit, a voltage stabilizing circuit, a protection circuit for protecting the isolation sampling module and a driving circuit for driving the switch unit.

Preferably, the second start unit comprises a driving circuit for driving the switch unit.

Preferably, the second detection unit is a high frequency detection unit for detecting a high frequency signal across both ends of the illuminating device and outputting the second detection signal.

According to another embodiment of the present invention, there is provided a method for driving an illuminating device, the illuminating device comprising: an LED illuminating module; a mains supply operation module, comprising an LED driving unit; and a ballast operation module, comprising a simulation filament unit, a first detection unit, a second detection unit, a switch unit, a first start unit and a second start unit; the method comprises the following steps: when the illuminating device is in a mains supply operation mode, the LED driving unit driving the LED illuminating module; when the illuminating device is in a magnetic ballast operation mode, the first detection unit detecting a voltage signal or frequency signal of the simulation filament unit and outputting a first detection signal, and after receiving the first detection signal, the first start unit enabling the switch unit to be in a conducting state and driving the LED illuminating module; and when the illuminating device is in an electronic ballast operation mode, the second detection unit detecting a voltage signal or frequency signal across both ends of the illuminating device and outputting a second detection signal, and after receiving the second detection signal, the second start unit enabling the switch unit to be in a conducting state and driving the LED illuminating module.

Preferably, the step of when the illuminating device is in a magnetic ballast operation mode, the first detection unit detecting a voltage signal or frequency signal of the simulation filament unit and outputting a first detection signal, and after receiving the first detection signal, the first start unit enabling the switch unit to be in a conducting state and driving the LED illuminating module comprises: a first detection circuit of the first detection unit detecting a voltage signal or frequency signal of a first simulation filament circuit of the simulation filament unit and outputting a first detection signal for first end, a second detection circuit of the first detection unit detecting a voltage signal or frequency signal of a second simulation filament circuit of the simulation filament unit and outputting a first detection signal for second end, and after receiving the first detection signal for first end and the first detection signal for second end, the first start unit enabling the switch unit to be in a conducting state and driving the LED illuminating module, wherein the first detection signal for first end and the first detection signal for second end are used as the first detection signal.

Preferably, the step of when the illuminating device is in a magnetic ballast operation mode, the first detection unit detecting a voltage signal or frequency signal of the simulation filament unit and outputting a first detection signal, and after receiving the first detection signal, the first start unit enabling the switch unit to be in a conducting state and driving the LED illuminating module comprises: when a first pair of connecting pins and a second pair of connecting pins of the illuminating device are coupled to a magnetic ballast, the first detection circuit of the first detection unit detecting a voltage signal or frequency signal of the first simulation filament circuit of the simulation filament unit and outputting a first detection signal for first end to the first start unit, the second detection circuit of the first detection unit detecting a voltage signal or frequency signal of the second simulation filament circuit of the simulation filament unit and outputting a first detection signal for second end to the first start unit, and after receiving the first detection signal for first end and the first detection signal for second end, the first start unit enabling the switch unit to be in a conducting state and driving the LED illuminating module to operate in the magnetic ballast operation mode, wherein the first detection signal for first end and the first detection signal for second end are used as the first detection signal.

Preferably, the step of when the illuminating device is in an electronic ballast operation mode, the second detection unit detecting a voltage signal or frequency signal across both ends of the illuminating device and outputting a second detection signal, and after receiving the second detection signal, the second start unit enabling the switch unit to be in a conducting state and driving the LED illuminating module comprises: when at least any two connecting pins among the first pair of connecting pins and the second pair of connecting pins of the illuminating device are coupled to an instant start ballast, the second detection unit detecting a voltage signal or frequency signal across both ends of the illuminating device and outputting the second detection signal, and after receiving the second detection signal, the second start unit enabling the switch unit to be in a conducting state and driving the LED illuminating module to operate in an instant start ballast operation mode.

Preferably, the step of when the illuminating device is in an electronic ballast operation mode, the second detection unit detecting a voltage signal or frequency signal across both ends of the illuminating device and outputting a second detection signal, and after receiving the second detection signal, the second start unit enabling the switch unit to be in a conducting state and driving the LED illuminating module comprises: when the first pair of connecting pins and the second pair of connecting pins of the illuminating device are coupled to a rapid start ballast or a program start ballast, the first detection circuit of the first detection unit detecting a voltage signal or frequency signal of a first simulation filament unit of the simulation filament unit and outputting a first detection signal for first end, the second detection circuit of the first detection unit detecting a voltage signal or frequency signal of a second simulation filament unit of the simulation filament unit and outputting a first detection signal for second end, the second detection unit detecting a voltage signal or frequency signal across both ends of the illuminating device and outputting the second detection signal, and after the first start unit receives the first detection signal for first end and the first detection signal for second end and the second start unit receives the second detection signal, the first start unit and the second start unit enabling the switch unit to be in a conducting state and driving the LED illuminating module to operate in a rapid start ballast operation mode or a program start ballast operation mode, wherein the first detection signal for first end and the first detection signal for second end are used as the first detection signal.

The technical solution of the present invention provides an illuminating device and a method for driving the illuminating device, which enables an LED tube to be compatible with electronic ballasts, magnetic ballasts and mains supplies at the same time, thereby solving the problem in the prior art of construction costs for cable change.

BRIEF DESCRIPTION OF THE DRAWINGS

The accompanying drawings constituting a part of the present application are used to provide a further understanding of the present invention. The schematic embodiments of the present invention and the description thereof are used to explain the present invention, and do not form improper limits to the present invention. In the drawings.

The figures above comprise the following reference signs:
10: illuminating device;
118: first simulation filament circuit;
104: first detection circuit;
122: first rectifier circuit;
116: LED driving unit;
126: protection circuit;
114: switch unit;
102: LED illuminating module;
110: first start unit;
112: second start unit;
108: second detection unit;
124: second rectifier circuit;
106: second detection circuit;
120: second simulation filament circuit.

DETAILED DESCRIPTION OF THE EMBODIMENTS

It needs to be illustrated that the embodiments of the present application and the features in the embodiments can be combined with each other without conflicts. Hereinafter, the present application will be described in detail with reference to the accompanying drawings in conjunction with embodiments.

It needs to be noted that unless otherwise indicated, all technical and scientific terms used in the present application have the same meanings as those commonly understood by a person of ordinary skill in the art to which the present application belongs.

In the present invention, unless otherwise defined, direction terms such as "upper", "lower", "top" and "bottom" used are generally regarding the directions shown in the figures, or regarding each component itself in vertical, perpendicular or gravity directions. Likewise, for ease of understanding and description, "inner" and "outer" refers to the interior and exterior relative to the outline of each component itself, but the described direction terms are not used to limit the present invention.

In order to solve the problem in the prior art that an LED tube cannot be compatible with electronic ballasts, magnetic ballasts and mains supplies at the same time, an illuminating device and a method for driving the illuminating device are provided.

Figure 1:
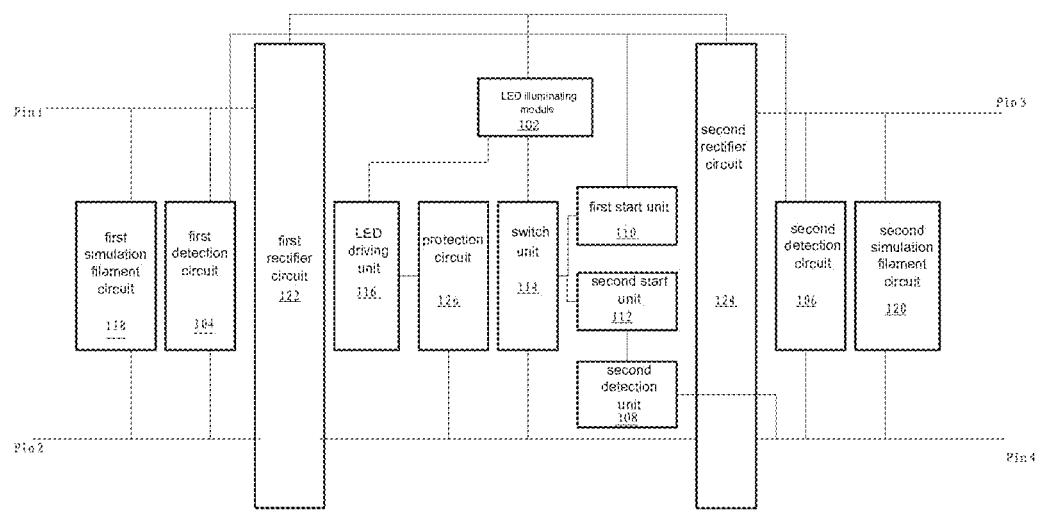
FIG. 1 shows a block diagram of an embodiment of the illuminating device according to the present invention.

FIG. 1 shows a block diagram of an embodiment of the illuminating device according to the present invention. As shown in FIG. 1, the illuminating device 10 comprises: an LED illuminating module 102; a mains supply operation module, comprising an LED driving unit 116 and a protection circuit 126, wherein the protection circuit 126 is used for automatically cutting off an electrical connection between the illuminating device 10 and an external power source (not shown) when a leakage current in the illuminating device 10 exceeds a predetermined threshold; a ballast operation module, comprising a simulation filament unit (comprising a first simulation filament circuit 118 and a second simulation filament circuit 120), a first detection unit (comprising a first detection circuit 104 and a second detection circuit 106), a second detection unit 108, a switch unit 114, a first start unit 110 and a second start unit 112; and a rectifier unit, comprising a first rectifier circuit 122 and a second rectifier circuit 124, wherein the first rectifier circuit 122 and the second rectifier circuit 124 are used for rectifying an alternating current inputted to the illuminating device 10 and outputting rectified direct current to the LED illuminating module 102.

When at least any two connecting pins among a first pair of connecting pins Pin 1, Pin 2 and a second pair of connecting pins Pin 3, Pin 4 of the illuminating device 10 are coupled to a mains supply, the LED driving unit 116 drives the LED illuminating module 102.

When the first pair of connecting pins Pin 1, Pin 2 and the second pair of connecting pins Pin 3, Pin 4 are coupled to a magnetic ballast, the first detection circuit 104 detects a voltage or frequency signal of the first simulation filament circuit 118 and outputs a first detection signal for first end to the first start unit 110, the second detection circuit 106 detects a voltage or frequency signal of the second simulation filament circuit 120 and outputs a first detection signal for second end to the first start unit 110, and after receiving the first detection signal for first end from the first detection circuit 104 and the first detection signal for second end from the second detection circuit 106, the first start unit 110 enables the switch unit 114 to be in a conducting state, and at this time, the LED driving unit 116 is in an inactive state (for example, bypassed), and thus the first start unit 110 drives, by means of the switch unit 114, the LED illuminating module 102 to operate in a magnetic ballast operation mode.

When at least one connecting pin among the first pair of connecting pins Pin 1, Pin 2 and the second pair of connecting pins Pin 3, Pin 4 is coupled to an electronic ballast, the second detection unit 108 detects a voltage or frequency across both ends of the illuminating device 10 and outputs a second detection signal, and after receiving the second detection signal, the second start unit 112 enables the switch unit 114 to be in a conducting state, and at this time, the LED driving unit 116 is in an inactive state (for example, bypassed), and thus the second start unit 112 drives, by means of the switch unit 114, the LED illuminating module 102 to operate in an electronic ballast operation mode. Preferably, the electronic ballast includes an instant start ballast, a rapid start ballast or a program start ballast. When at least two connecting pins among the first pair of connecting pins Pin 1, Pin 2 and the second pair of connecting pins Pin 3, Pin 4 are coupled to the instant start ballast, the second detection unit 108 detects a voltage or frequency across both ends of the illuminating device 10 and outputs the second detection signal, and after receiving the second detection signal, the second start unit 112 enables the switch unit 114 to be in a conducting state, at this time, the LED driving unit 116 is in an inactive state (for example, bypassed), and thus the second start unit 112 drives, by means of the switch unit 114, the LED illuminating module 102 to operate in an instant start ballast operation mode.

When the first pair of connecting pins Pin 1, Pin 2 and the second pair of connecting pins Pin 3, Pin 4 are coupled to the rapid start ballast or the program start ballast, the first detection circuit 104 detects a voltage or frequency of the first simulation filament unit 118 and outputs a first detection signal for first end, the second detection circuit 106 detects a voltage or frequency of the second simulation filament unit 120 and outputs a first detection signal for second end, the second detection unit 108 detects a voltage or frequency across both ends of the illuminating device 10 and outputs the second detection signal, after the first start unit 110 receives the first detection signal for first end from the first detection circuit 104 and the first detection signal for second end from the second detection circuit 106, and the second start unit 112 receives the second detection signal, the first start unit and the second start unit cooperate to enable the switch unit 114 to be in a conducting state, and the LED driving unit 116 is in an inactive state (e.g., bypassed), and thus the first start unit 110 and the second start unit 112 drive, by means of the switch unit 114, the LED illuminating module 102 to operate in a rapid start ballast operation mode or a program start ballast operation mode.

Figure 2:
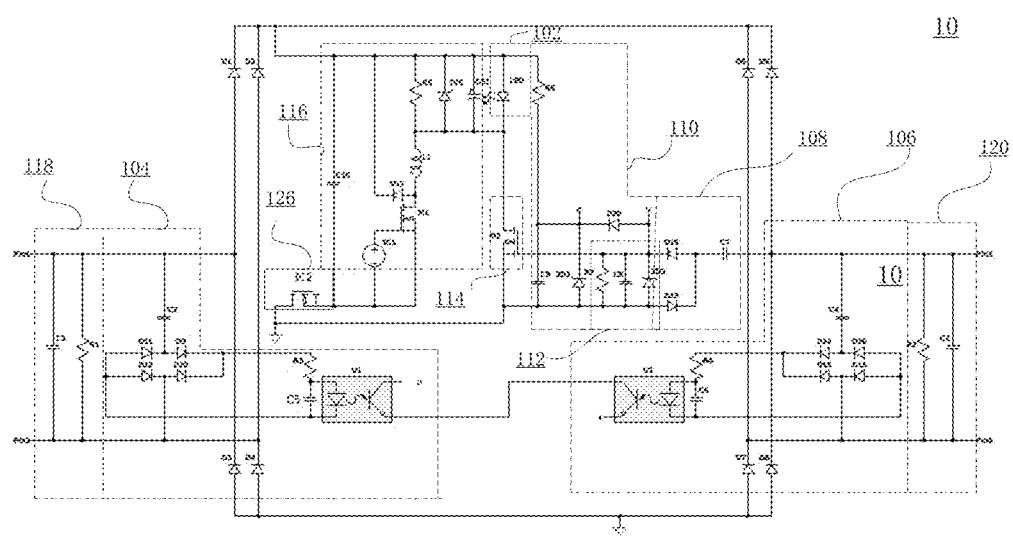
FIG. 2 shows a schematic view of the illuminating device in FIG. 1.

Next, a schematic view of the illuminating device in FIG. 1 will be described in detail with reference to FIG. 2. In FIG. 2, the same reference signs are used to denote a circuit structure corresponding to the units in FIG. 1. As shown in FIG. 2, the illuminating device comprises:

an LED illuminating module 102;

a mains supply operation module, comprising an LED driving unit 116 and a protection circuit 126, wherein the LED driving unit 116 is a constant current control unit or a constant voltage control unit, and the LED driving unit 116 comprises a transient voltage suppression module-(for example, a transient voltage suppressor (TVS)) and/or a Buck driver module (for example, a Buck driver circuit comprising an inductor L1, a diode D17, a switch M1 and a chip IC1), and the protection circuit 126 (for example, a protection circuit comprising a chip 102) is used for automatically cutting off an electrical connection between the illuminating device 10 and an external power source (not shown) when a leakage current in the illuminating device 10 exceeds a predetermined threshold; and a ballast operation module, comprising a simulation filament unit, a first detection unit, a second detection unit, a switch unit, a first start unit and a second start unit; Specifically, the simulation filament unit comprises a first simulation filament circuit 118 and a second simulation filament circuit 120, and the first detection unit comprises a first detection circuit 104 and a second detection circuit 106. As shown in FIG. 2, the second detection unit 108 comprises a high frequency signal detection circuit comprising a capacitor C7 and diodes D18 and D19. The switch unit 114 comprises a switch M2. The first start unit 110 comprises a driving resistor R6 for driving the switch M2, a voltage stabilizing circuit comprising a capacitor C9 and a Zener diode ZD1, a diode D20 serving as a protection circuit for protecting the isolation sampling module (for example, an isolation sampling module comprises an optocoupler U1 and an optocoupler U2 in FIG. 2, as will be described in more detail below), and a driving circuit which comprises a resistor R7, a capacitor C8 and a Zener diode ZD2 and is used for driving the switch M2. The second start unit 112 comprises a driving circuit which comprises a resistor R7, a capacitor C8 and a Zener diode ZD2 and is used for driving the switch M2. As shown in FIG. 2, the first simulation filament circuit 118 comprises a capacitor C1 and a resistor R1 connected in parallel (alternatively, the first simulation filament circuit 118 may comprise a capacitor C1 and a resistor R1 connected in series), and the second simulation filament circuit 120 comprises a capacitor C2 and a resistor R2 connected in parallel (alternatively, the second simulation filament circuit 120 may comprise a capacitor C2 and a resistor R2 connected in series). The first detection circuit 104 comprises a capacitor C3 for limiting a current (in addition, which may also be replaced by a resistor for limiting a current), a rectifier unit comprising diodes D9 to D12, a filtering unit comprising resistors R3 and C5, and an isolation sampling module (e.g., which may be the optocoupler U1). Similarly, the second detection circuit 106 comprises a capacitor C4 for limiting a current (in addition, which may also be replaced by a resistor for limiting a current), a rectifier unit comprising diodes D13 to D16, a filtering unit comprising resistors R4 and C6, and an isolation sampling module (e.g., which may be the optocoupler U2). As shown in FIG. 2, a terminal a of the isolation sampling module U1 and a terminal c of the isolation sampling module U2 are connected to corresponding terminals (i.e., terminals a and c of the first start unit 110) of the first start unit 110; and the rectifier unit comprises a first rectifier circuit and a second rectifier circuit, wherein the first rectifier circuit and the second rectifier circuit are used for rectifying an alternating current inputted to the illuminating device 10 and outputting, by means of the driving unit, rectified direct current to the LED illuminating module 102, and wherein the first rectifier circuit comprises a rectifier bridge comprising four diodes (i.e. diodes D1, D2, D3 and D4) and the second rectifier circuit comprises a rectifier bridge comprising four diodes (i.e. diodes D5, D6, D7 and D8). In addition, according to design requirements, the first rectifier circuit and the second rectifier circuit may each comprise a rectifier bridge comprising 2, 8 or 16 diodes.

In the circuit shown in FIG. 2, when at least any two connecting pins among a first pair of connecting pins Pin 1, Pin 2 and a second pair of connecting pins Pin 3, Pin 4 of the illuminating device 10 are coupled to a mains supply, the LED driving unit 116 drives the LED illuminating module 102. When the first pair of connecting pins Pin 1, Pin 2 and the second pair of connecting pins Pin 3, Pin 4 are coupled to a magnetic ballast, the first detection circuit 104 detects a voltage or frequency signal (preferably a voltage signal) of the first simulation filament circuit 118 and outputs a first detection signal for first end to the first start unit 110, the second detection circuit 106 detects a voltage or frequency signal (preferably a voltage signal) of the second simulation filament circuit 120 and outputs a first detection signal for second end to the first start unit 110, and after receiving the first detection signal for first end from the first detection circuit 104 and the first detection signal for second end from the second detection circuit 106 (i.e. terminals a and c of the first start unit 110 are connected to a terminal a of the optocoupler U1 in the first detection circuit 104 and a terminal c of the optocoupler U2 in the second detection circuit 106, respectively), the first start unit 110 enables the switch unit 114 (for example, the switch M2) to be in a conducting state, and at this time, the LED driving unit 116 is in an inactive state (for example, bypassed), and thus, the first start unit 110 drives, by means of the switch unit 114, the LED illuminating module 102 to operate in a magnetic ballast operation mode.

When at least one connecting pin among the first pair of connecting pins Pin 1, Pin 2 and the second pair of connecting pins Pin 3, Pin 4 is coupled to an electronic ballast, the second detection unit 108 detects a voltage or frequency across both ends of the illuminating device 10 and outputs the second detection signal, and after receiving the second detection signal, the second start unit 112 enables the switch unit 114 to be in a conducting state, and at this time, the LED driving unit 116 is in an inactive state (for example, bypassed), and thus, the second start unit 112 drives, by means of the switch unit 114, the LED illuminating module 102 to operate in an electronic ballast operation mode. Preferably, when at least any two connecting pins among the first pair of connecting pins Pin 1, Pin 2 and the second pair of connecting pins Pin 3, Pin 4 are coupled to an instant start ballast, the second detection unit 108 detects a voltage or frequency (preferably a high frequency signal) across both ends of the illuminating device 10 and outputs the second detection signal, and after receiving the second detection signal, the second start unit 112 enables the switch unit 114 to be in a conducting state, and at this time, the LED driving unit 116 is in an inactive state (for example, bypassed), and thus, the second start unit 112 drives, by means of the switch unit 114, the LED illuminating module 102 to operate in an instant start ballast operation mode. When the first pair of connecting pins Pin 1, Pin 2 and the second pair of connecting pins Pin 3, Pin 4 are coupled to a rapid start ballast or a program start ballast, the first detection circuit 104 detects a voltage or frequency (preferably, a voltage signal) of the first simulation filament unit 118 and outputs a first detection signal for first end, the second detection circuit 106 detects a voltage or frequency (preferably a voltage signal) of the second simulation filament unit 120 and outputs a first detection signal for second end, the second detection unit 108 detects a voltage or frequency (preferably a high frequency signal) across both ends of the illuminating device 10 and outputs the second detection signal, and after the first start unit 110 receives the first detection signal for first end from the first detection circuit 104 and the first detection signal for second end from the second detection circuit 106 and the second start unit 112 receives the second detection signal, the first start unit and the second start unit cooperate to enable the switch unit 114 to be in a conducting state, and the LED driving unit 116 is in an inactive state (e.g., bypassed), and thus, the first start unit 110 and the second start unit 112 drive, by means of the switch unit 114, the LED illuminating module 102 to operate in a rapid start ballast operation mode or a program start ballast operation mode.

Specifically, referring to Table 1, the relationships among the input modes, the start circuits and the operation modes of the illuminating device are shown:

TABLE 1

| input mode | filament voltage | high frequency input signal |
|---|---|---|
| mains supply | x | x |
| instant start ballast | x | ✓ |
| rapid start ballast and program start ballast | ✓ | ✓ |
| magnetic ballast | ✓ | x |

| input mode | first start unit | second start unit |
|---|---|---|
| mains supply | x | x |
| instant start ballast | x | ✓ |
| rapid start ballast and program start ballast | ✓ | ✓ |
| magnetic ballast | ✓ | x |

| input mode | Type A operation mode | Type B operation mode |
|---|---|---|
| mains supply | | ✓ |
| instant start ballast | ✓ | |
| rapid start ballast and program start ballast | ✓ | |
| magnetic ballast | ✓ | | wherein in Table 1, "✓" indicates existence, and "x" indicates non-existence.

As shown in Table 1, the illuminating device of the present invention can work in different modes under different input modes of electronic ballasts, magnetic ballasts and mains supplies, so as to be compatible with different types of ballasts and mains supplies.

Figure 3:
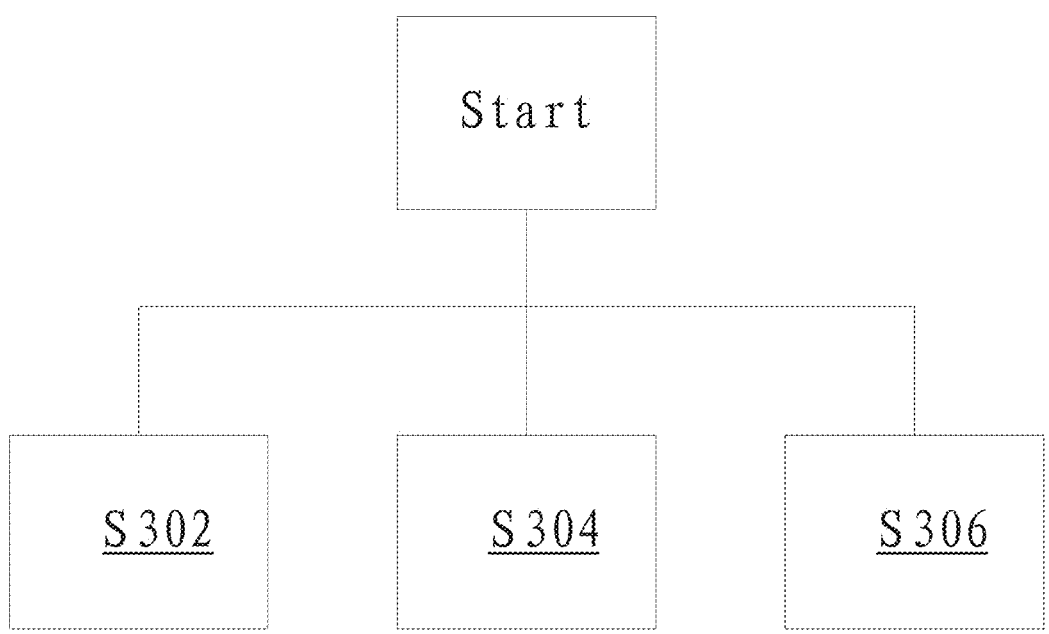
FIG. 3 shows a flowchart of a method for driving the illuminating device according to the present invention.

FIG. 3 shows a flowchart of a method for driving the illuminating device according to the present invention. In FIG. 3, the driving method can perform the following steps according to different input modes: S302, when the illuminating device is in a mains supply operation mode, the LED driving unit driving the LED illuminating module; S304, when the illuminating device is in a magnetic ballast operation mode, the first detection unit detecting a voltage or frequency of the simulation filament unit and outputting a first detection signal, and after receiving the first detection signal, the first start unit enabling the switch unit to be in a conducting state and driving the LED illuminating module; and S306, when the illuminating device is in an electronic ballast operation mode, the second detection unit detecting a voltage or frequency across both ends of the illuminating device and outputting a second detection signal, and after receiving the second detection signal, the second start unit enabling the switch unit to be in a conducting state and driving the LED illuminating module.

Herein, the present invention is implemented in the most preferred manner to solve the problem in the prior art that the illuminating device cannot be compatible with different input modes.

From the description above, it can be determined that the embodiments above of the present invention achieve the following technical effects:

1. one illuminating device is compatible with three modes of electronic ballasts, magnetic ballasts and mains supplies at the same time, and can adapt lamps of various power supply types, and has improved compatibility and wide applicability; and 2. when a user needs to eliminate an old illuminating device, there is no need to consider which kind of power supply manner of illuminating devices at home is, and there is no need to purchase an illuminating device dedicated to a specific power supply manner; it is only necessary to chose the illuminating device of the present invention without changing the cable, which, on the one hand, improves the convenience of replacing an illuminating device, and on the other hand, avoids expensive construction costs for cable change.

Apparently, the embodiments described above are merely a part rather than all of the embodiments of the present invention. All other embodiments obtained by a person of ordinary skill in the art based on the embodiments of the present invention without inventive efforts shall belong to the scope of protection of the present invention.

It should be noted that the terminologies used herein are for the purpose of describing particular exemplary embodiments only and are not intended to limit exemplary embodiments in accordance with the present application. As used herein, unless the context clearly indicates otherwise, the singular form is intended to comprise the plural form as well; and further, it is to be understood that the terms "comprises" and/or "comprising" when used in this description, specify the presence of features, steps, operations, devices, components and/or combinations thereof.

It should be noted that the terms "first" and "second", etc. in the description, claims and accompanying drawings of the present application are used to distinguish similar objects, and are not necessarily used to describe a specific sequence or order. It should be understood that data used in such a way may be interchanged where appropriate so that the embodiments of the present application described herein can be implemented in sequences other than those illustrated or described herein.

The description above is only preferred embodiments of the present invention, and is not intended to limit the present invention. For a person skilled in the art, the present invention may have various modifications and variations. Any modifications, equivalent replacements, improvements, etc. made within the spirit and principle of the present utility model shall fall within the scope of protection of the present invention.

What is claimed is:

1. An illuminating device, comprising:
an LED illuminating module;
a mains supply operation module, comprising an LED driving unit; and
a ballast operation module, comprising a simulation filament unit, a first detection unit, a second detection unit, a switch unit, a first start unit and a second start unit;
wherein when the illuminating device is in a mains supply operation mode, the LED driving unit is used for driving the LED illuminating module;
when the illuminating device is in a magnetic ballast operation mode, the first detection unit detects a voltage signal or frequency signal of the simulation filament unit and outputs a first detection signal, and after receiving the first detection signal, the first start unit enables the switch unit to be in a conducting state and drives the LED illuminating module; and when the illuminating device is in an electronic ballast operation mode, the second detection unit detects a voltage signal or frequency signal across both ends of the illuminating device and outputs a second detection signal, and after receiving the second detection signal, the second start unit enables the switch unit to be in a conducting state and drives the LED illuminating module, wherein the first start unit comprises a driving resistor for driving the switch unit, a voltage stabilizing circuit, a protection circuit for protecting an isolation sampling module, and a driving circuit for driving the switch unit.

2. The illuminating device according to claim 1, wherein the simulation filament unit comprises a first simulation filament circuit and a second simulation filament circuit, the first detection unit comprises a first detection circuit and a second detection circuit, the first detection circuit detects a voltage signal or frequency signal of the first simulation filament circuit and outputs a first detection signal for first end, and the second detection circuit detects a voltage signal or frequency signal of the second simulation filament circuit and outputs a first detection signal for second end, wherein the first detection signal for first end and the first detection signal for second end are used as the first detection signal.

3. The illuminating device according to claim 2, wherein the illuminating device further comprises a first pair of connecting pins and a second pair of connecting pins, wherein the first pair of connecting pins and the second pair of connecting pins are provided at opposite ends of the illuminating device in a longitudinal direction, and at least one connecting pin among the first pair of connecting pins and the second pair of connecting pins is coupled to an external power source.

4. The illuminating device of claim 3, wherein when at least any two connecting pins among the first pair of connecting pins and the second pair of connecting pins are coupled to a mains supply, the LED illuminating module works in a mains supply operation mode under the driving of the LED driving unit.

5. The illuminating device according to claim 3, wherein when the first pair of connecting pins and the second pair of connecting pins are coupled to a magnetic ballast, the first detection circuit detects a voltage signal or frequency signal of the first simulation filament circuit and outputs a first detection signal for first end to the first start unit, the second detection circuit detects a voltage signal or frequency signal of the second simulation filament circuit and outputs a first detection signal for second end to the first start unit, and after receiving the first detection signal for first end and the first detection signal for second end, the first start unit enables the switch unit to be in a conducting state, and drives the LED illuminating module to operate in the magnetic ballast operation mode.

6. The illuminating device according to claim 3, wherein the electronic ballast operation mode includes an instant start ballast operation mode, a rapid start ballast operation mode and a program start ballast operation mode.

7. The illuminating device according to claim 6, wherein when at least any two connecting pins among the first pair of connecting pins and the second pair of connecting pins are coupled to an instant start ballast, the second detection unit detects a voltage signal or frequency signal across both ends of the illuminating device and outputs the second detection signal, and after receiving the second detection signal, the second start unit enables the switch unit to be in a conducting state and drives the LED illuminating module to operate in an instant start ballast operation mode.

8. The illuminating device according to claim 6, wherein when the first pair of connecting pins and the second pair of connecting pins are coupled to a rapid start ballast or a program start ballast, the first detection circuit detects a voltage signal or frequency signal of the first simulation filament unit and outputs a first detection signal for first end, the second detection circuit detects a voltage signal or frequency signal of the second simulation filament unit and outputs a first detection signal for second end, the second detection unit detects a voltage signal or frequency signal across both ends of the illuminating device and outputs the second detection signal, and after the first start unit receives the first detection signal for first end and the first detection signal for second end and the second start unit receives the second detection signal, the first start unit and the second start unit enable the switch unit to be in a conducting state and drive the LED illuminating module to operate in a rapid start ballast operation mode or a program start ballast operation mode.

9. The illuminating device according to claim 1, wherein the illuminating device further comprises:
a rectifier unit for rectifying an alternating current inputted to the illuminating device, and outputting rectified direct current to the LED illuminating module.

10. The illuminating device according to claim 1, wherein the mains supply operation module further comprises:
a protection circuit for automatically cutting off an electrical connection between the illuminating device and an external power source when a leakage current in the illuminating device exceeds a predetermined threshold.

11. The illuminating device according to claim 2, wherein each of the first simulation filament circuit and the second simulation filament circuit comprises at least one resistor unit and at least one capacitor unit connected in parallel and/or in series with each other.

12. The illuminating device according to claim 2, wherein each of the first detection circuit and the second detection circuit comprises a current limiting unit, a rectifier unit, a filtering unit and an isolation sampling unit.

13. The illuminating device according to claim 12, wherein the current limiting unit comprises a current limiting capacitor or a current limiting resistor.

14. The illuminating device according to claim 12, wherein the isolation sampling unit comprises an optocoupler module.

15. The illuminating device according to claim 1, wherein the second detection unit comprises a frequency detection unit and a half bridge rectifier unit.

16. The illuminating device according to claim 9, wherein the rectifier unit comprises a first rectifier circuit and a second rectifier circuit, each of the first rectifier circuit and the second rectifier circuit comprising a rectifier bridge composed of 2, 4, 8, or 16 diodes.

17. The illuminating device according to claim 1, wherein the LED driving unit is a constant current control unit or a constant voltage control unit, and the LED driving unit comprises a transient voltage suppression and a buck driver module.

18. The illuminating device according to claim 1, wherein the switch unit comprises a switch.

19. The illuminating device according to claim 1, wherein the second start unit comprises a driving circuit for driving the switch unit.

20. The illuminating device according to claim 1, wherein the second detection unit is a high frequency detection unit for detecting a high frequency signal at both ends of the illuminating device and outputting the second detection signal.

21. A method for driving an illuminating device,
the illuminating device comprising:
an LED illuminating module;
a mains supply operation module, comprising an LED driving unit; and
a ballast operation module, comprising a simulation filament unit, a first detection unit, a second detection unit, a switch unit, a first start unit and a second start unit;
wherein the first start unit comprises a driving resistor for driving the switch unit, a voltage stabilizing circuit, a protection circuit for protecting an isolation sampling module, and a driving circuit for driving the switch unit,
the method comprising:
when the illuminating device is in a mains supply operation mode, driving the LED illuminating module via the LED driving unit;
when the illuminating device is in a magnetic ballast operation mode, detecting a voltage signal or frequency signal of the simulation filament unit and outputting a first detection signal via the first detection unit, and after receiving the first detection signal, enabling the switch unit to be in a conducting state and driving the LED illuminating module via the first start unit; and
when the illuminating device is in an electronic ballast operation mode, detecting a voltage signal or frequency signal across both ends of the illuminating device and outputting a second detection signal via the second detection unit, and after receiving the second detection signal, enabling the switch unit to be in a conducting state and driving the LED illuminating module via the second start unit.

22. The driving method according to claim 21, wherein the step of when the illuminating device is in the magnetic ballast operation mode, the first detection unit detecting a voltage signal or frequency signal of the simulation filament unit and outputting a first detection signal, and after receiving the first detection signal, the first start unit enabling the switch unit to be in a conducting state and driving the LED illuminating module comprises:
detecting a voltage signal or frequency signal of a first simulation filament circuit of the simulation filament unit and a first detection signal for first end via a first detection circuit of the first detection unit, and detecting a voltage signal or frequency signal of a second simulation filament circuit of the simulation filament unit and outputting a first detection signal for second end via a second detection circuit of the first detection unit, and after receiving the first detection signal for first end and the first detection signal for second end, enabling the switch unit to be in a conducting state and driving the LED illuminating module via the first start unit, wherein the first detection signal for first end and the first detection signal for second end are used as the first detection signal.

23. The driving method according to claim 21, wherein the step of when the illuminating device is in the magnetic ballast operation mode, the first detection unit detecting a voltage signal or frequency signal of the simulation filament unit and outputting a first detection signal, and after receiving the first detection signal, the first start unit enabling the switch unit to be in a conducting state and driving the LED illuminating module comprises:

when the first pair of connecting pins and the second pair of connecting pins of the illuminating device are coupled to a magnetic ballast, detecting a voltage signal or frequency signal of a first simulation filament circuit of the simulation filament unit and outputting a first detection signal for first end to the first start unit via a first detection circuit of the first detection unit, detecting a voltage signal or frequency signal of a second simulation filament circuit of the simulation filament unit and outputting a first detection signal for second end to the first start unit via a second detection circuit of the first detection unit, and after the first start unit receives the first detection signal for first end and the first detection signal for second end, enabling the switch unit to be in a conducting state and driving the LED illuminating module to operate in the magnetic ballast operation mode via the first start unit, wherein the first detection signal for first end and the first detection signal for second end are used as the first detection signal.

24. The driving method according to claim 21, wherein the step of when the illuminating device is in the electronic ballast operation mode, the second detection unit detecting a voltage signal or frequency signal across both ends of the illuminating device and outputting the second detection signal, and after receiving the second detection signal, the second start unit enabling the switch unit to be in a conducting state and driving the LED illuminating module comprises:

when at least any two connecting pins among the first pair of connecting pins and the second pair of connecting pins of the illuminating device are coupled to an instant start ballast, detecting a voltage signal or frequency signal across both ends of the illuminating device and outputting the second detection signal via the second detection unit, and after receiving the second detection signal, enabling the switch unit to be in a conducting state and driving the LED illuminating module to operate in an instant start ballast operation mode via the second start unit.

25. The driving method according to claim 21, wherein the step of when the illuminating device is in the electronic ballast operation mode, the second detection unit detecting a voltage signal or frequency signal across both ends of the illuminating device and outputting the second detection signal, and after receiving the second detection signal, the second start unit enabling the switch unit to be in a conducting state and driving the LED illuminating module comprises:

when the first pair of connecting pins and the second pair of connecting pins of the illuminating device are coupled to a rapid start ballast or a program start ballast, detecting a voltage signal or frequency signal of a first simulation filament unit of the simulation filament unit and outputting a first detection signal for first end via a first detection circuit of the first detection unit, a second detection circuit of the first detection unit detecting a voltage signal or frequency signal of a second simulation filament unit of the simulation filament unit and outputting a first detection signal for second end via a second detection circuit of the first detection unit, detecting a voltage signal or frequency signal across both ends of the illuminating device and outputting the second detection signal via the second detection unit, and after the first start unit receives the first detection signal for first end and the first detection signal for second end and the second start unit receives the second detection signal, enabling the switch unit to be in a conducting state and driving the LED illuminating module to operate in a rapid start ballast operation mode or a program start ballast operation mode via the first start unit and the second start unit, wherein the first detection signal for first end and the first detection signal for second end are used as the first detection signal.

* * * * *